(12) United States Patent
Zihnioglu

(10) Patent No.: US 11,637,909 B1
(45) Date of Patent: Apr. 25, 2023

(54) PREEMPTIVE TCP CONNECTIONS TO REDUCE LATENCY FOR PROXIES

(71) Applicant: Webshare Software Company, Walnut, CA (US)

(72) Inventor: Asim Utku Zihnioglu, Walnut, CA (US)

(73) Assignee: WEBSHARE SOFTWARE COMPANY, Covina, CA (US)

( * ) Notice: Subject to any disclaimer, the term of this patent is extended or adjusted under 35 U.S.C. 154(b) by 0 days.

(21) Appl. No.: 17/570,291

(22) Filed: Jan. 6, 2022

(51) Int. Cl.
*H04L 67/56* (2022.01)
*H04L 67/14* (2022.01)
*H04L 69/16* (2022.01)

(52) U.S. Cl.
CPC .............. *H04L 67/56* (2022.05); *H04L 67/14* (2013.01); *H04L 69/16* (2013.01)

(58) Field of Classification Search
None
See application file for complete search history.

(56) References Cited

U.S. PATENT DOCUMENTS

2006/0031520 A1* 2/2006 Bedekar .................. H04L 67/04
709/227
2014/0237067 A1 8/2014 Todd

OTHER PUBLICATIONS

International Searching Authority, "Search Report", in International Application No. PCT/US2022/051733, dated Feb. 28, 2023, 4 pages.
Current Claims in International Application No. PCT/US2022/051733, dated Feb. 28, 2023, 3 pages.

\* cited by examiner

*Primary Examiner* — Schquita D Goodwin
*Assistant Examiner* — Ishrat Rashid
(74) *Attorney, Agent, or Firm* — Hickman Becker Bingham Ledesma LLP; Malgorzata A. Kulczycka

(57) ABSTRACT

In some embodiments, a computer-implemented method comprises: receiving, at a proxy server, a plurality of active communications connection counts of a plurality of active communications connections that were active within a time period; determining a top count of active communications connections selected from the plurality of active communications connection counts; for each count of the top counts of active communications connections: determining a relative percentage of pre-connected communications connections, having a particular connection type and included in the count, to be pre-connected by the proxy server and available; determining whether the relative percentage of the pre-connected communications connections of the particular connection type is already pre-connected by the proxy server and is available; and if not, pre-connecting one or more particular communications connections of the particular connection type until the relative percentage of the pre-connected communications connections of the particular connection type is pre-connected and available.

20 Claims, 7 Drawing Sheets

PREEMPTIVE TCP CONNECTIONS TO REDUCE LATENCY FOR PROXIES

TECHNICAL FIELD

The present disclosure relates to computer networking. More specifically, some embodiments of the present disclosure relate to preemptive establishing TCP communications connections between a proxy and destination hosts to reduce latency in services provided by the proxy.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

A proxy server is usually implemented as an intermediary between a source host/computer used by a user and a destination host/server implementing a website, a data center, and the like. The source host/computer is an entity from which the user requests services available at the destination host/server.

A proxy server may execute, for example, the HTTP or SOCKS5 communications protocol. Typically, when a user of a source computer connects to a proxy server by initiating a TCP connection, the user indicates to the proxy a destination to which the user wants to connect to. For example, the user may send an HTTP request or a SOCKS5 request (each of which may indicate a destination domain name, a destination port (e.g., default 443 for HTTPS or 80 for HTTP).

To facilitate communications between a source computer and a destination, the proxy server determines a destination host that services the destination and establishes a TCP communications connection between the proxy server and the destination host. Once the TCP connection with the destination host is established, the proxy server facilitates communications between the source computer and the destination via a communications session that spans over two communications connections: the TCP connection established between the source computer and the proxy server, and the TCP connection established between the proxy server and the destination host. Subsequently, the source computer starts transmitting data through the proxy server to the destination host, and the destination host starts transmitting data through the proxy server to the source computer. Upon termination of the communications session, the TCP communications connections are terminated.

One problem with facilitating the communications session between a source computer and a destination host via a proxy server is that establishing a TCP communications connection between the proxy and the destination host when such a connection is requested requires performing, as for any TCP connection, a three-way-handshake between the proxy and the destination host. Performing the three-way handshake is, for a variety of reasons, a relatively time consuming process, which causes a relatively long time delay before the corresponding TCP connection can be actually functional. The delay, i.e., the time latency, is undesirable because it causes a user to wait until the user receives a confirmation from the proxy that the connection has been finally established.

One approach directed to eliminating the delay may be to pre-connect the proxy server to various destinations and have the pre-connected communications connections ready before users actually request connecting to the corresponding destination. However, with the development of the World Wide Web and the multitude of websites and data centers, pre-connecting to all possible destinations is virtually impossible. Furthermore, in some situations, some of the pre-computed connections may expire before they are actually requested. Moreover, in some situations, maintaining status information for the unused pre-computed connections may occupy valuable resources of the proxy and pose a toll on the proxy itself. Therefore, this approach may be neither a trivial task nor a reasonable task.

In this approach, pre-connecting communications connections would include preemptively creating TCP connections from the proxy to many destination servers and storing the status information about the TCP connections for a certain time period during which, hopefully, the proxy receives requests for the corresponding TCP connections. If a request for a particular TCP communications connection is received from a user before the expiration of the certain time period, then the corresponding pre-computed TCP connection is assigned to the user and is subsequently used and utilized. However, if no request is received for the particular TCP communications connection from any user before the expiration of the certain time period, then the pre-computed TCP connection is never used.

One of the key challenges of pre-connecting the communications connection using the approach described above is that it would require a proxy server to maintain a rather large pool of pre-connected TCP connections, some of which have a rather low chance of ever being used. Since the resources of the proxy server and of the computer network are usually limited, the proxy can realistically maintain only a relatively small number of pre-connected TCP connections at the time (e.g., about 10,000 connections at a given time). Furthermore, each one of these TCP connections can only be kept connected for a small amount of time to prevent involuntary disconnects (e.g., 5 seconds).

Other approaches include pre-connecting by load balancers. These approaches require, however, pre-connecting to known destinations which need to be known in advance. For example, for a given destination, they require pre-connecting to one IP address of the destination. Those approaches include the approaches implemented in Nginx, and HAProxy, and others. Because of the above constraints, the applicability of those approaches is rather limited.

Other approaches include pre-connecting from web browsers to known destinations. These approaches are implemented in popular web browsers. However, again, because of the above constraints, the applicability of those approaches is rather limited.

Therefore, there is a need for developing mechanisms that allow a proxy server to preemptively establish TCP communications connections between the proxy server and destination hosts to prevent the delay in establishing the TCP connections when the proxy server is in the process of enabling source hosts to access the services provided by the destination hosts.

BRIEF DESCRIPTION OF THE DRAWINGS

Some embodiments of the present approach are illustrated by way of example, and not in way by limitation, in the figures of the accompanying drawings and in which like reference numerals refers to similar elements and in which.

DETAILED DESCRIPTION

Figure 1:
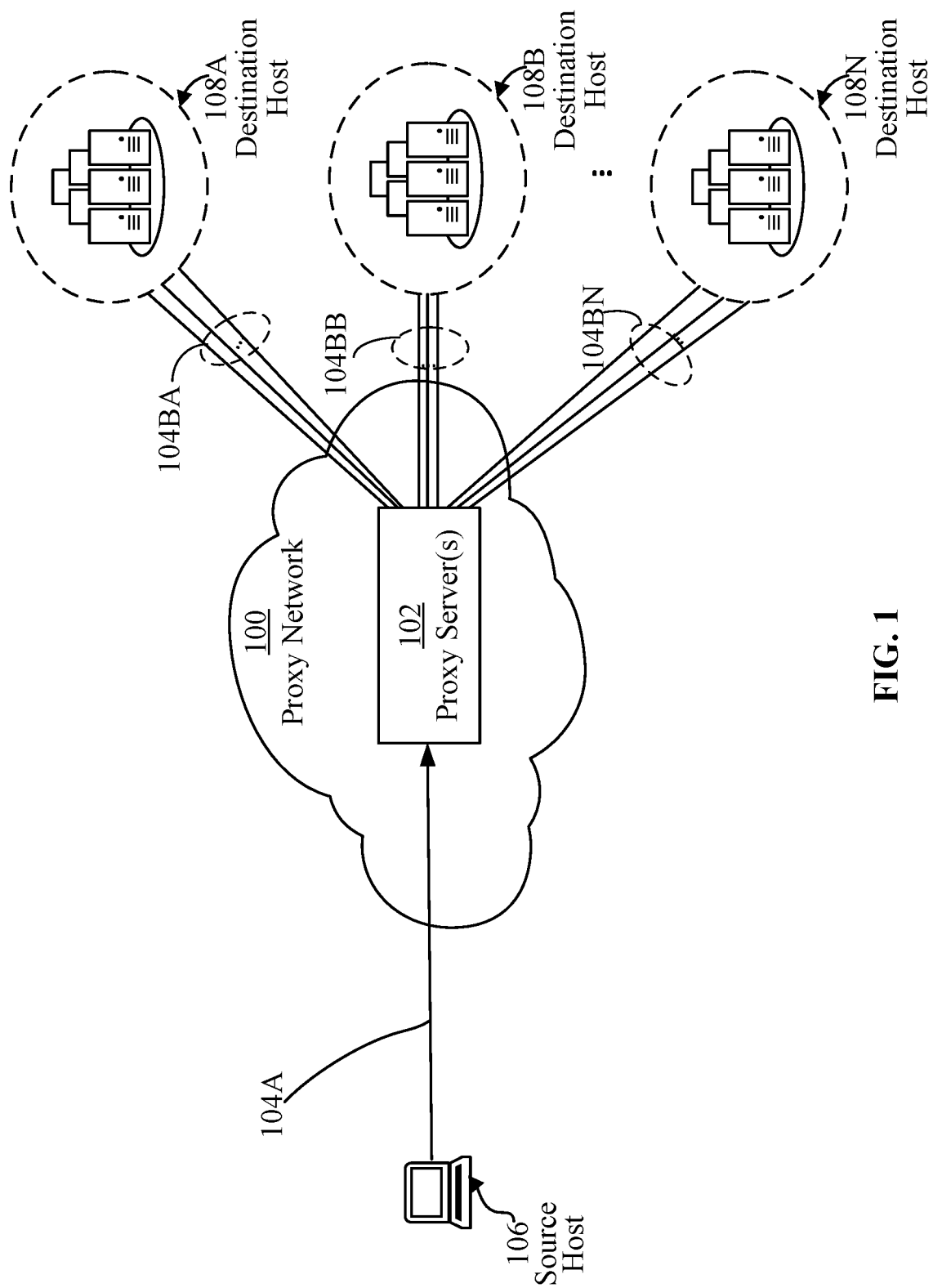
FIG. 1 is a diagram depicting an example proxy network in which some embodiments are implemented.

In the following description, for the purposes of explanation, numerous specific details are set forth in order to provide a thorough understanding of some embodiments of the present approach. It will be apparent, however, that some embodiments may be practiced without these specific details. In other instances, well-known structures and devices are shown in block diagram form in order to avoid unnecessarily obscuring some embodiments.

The detailed description is organized below according to the following outline:

1.0. OVERVIEW
   1.1. ESTABLISHING PREEMPTIVE TCP CONNECTIONS
   1.2. UTILIZING PREEMPTIVELY ESTABLISHED TCP CONNECTIONS
2.0. PROXY NETWORKS
   2.1. FUNCTIONALITIES OF PROXY NETWORKS
   2.2. EXAMPLE PROXY NETWORK
3.0. TCP THREE-WAY-HANDSHAKE PROCESS
   3.1. TCP THREE-WAY-HANDSHAKE PROCESS WITH A DESTINATION
   3.2. TCP THREE-WAY-HANDSHAKE PROCESS WITH A SOURCE
4.0. ESTABLISHING PREEMPTIVE TCP CONNECTIONS TO REDUCE LATENCY FOR PROXIES
   4.1. DETERMINING WHICH CONNECTIONS TO PRE-CONNECT
   4.2. PRE-CONNECTING CONNECTIONS BASED ON HISTORICAL DATA
   4.3. MISCELLANEOUS CASES
5.0. FLOW CHART FOR PREEMPTIVELY ESTABLISHING TCP COMMUNICATIONS CONNECTIONS
6.0. FLOW CHART FOR UTILIZING PREEMPTIVELY ESTABLISHED TCP COMMUNICATIONS CONNECTIONS
7.0. HARDWARE IMPLEMENTATION
8.0. GENERAL CONSIDERATIONS 1.0. Overview Disclosed approaches allow establishing TCP communications connections between a proxy server and destination hosts in the preemptive and efficient manner. The connections are established before the connections are actually requested by source hosts from the proxy. The approaches allow optimizing the number of preemptively configured connections to establishing only those that are most likely to be requested. Therefore, the approaches allow establishing only those connections that, based on historical data, appear to be the connections that are requested most often. Hence, the approaches presented herein allow preemptively establishing not all possible TCP communications connections, but only those that will most likely be requested.

One of the benefits of the presented approach for preemptively establishing TCP communications connections is reductions of the latency during the process of establishing communications connections when the proxy facilitates communications between the source hosts and the destination hosts.

Another benefit of the presented approach is a reduction of a pool of pre-connected TCP connections at the proxy server only to those that have the highest chance of being used. Since the system and network resources are limited, reducing the pool of pre-connected TCP connections to a relatively small number of pre-connected TCP connections available at the proxy (e.g., ~10,000 connections) allows using fewer resources such as memory, processing power, communications bus, and the like.

Another benefit of the presented approach is that each one of the preemptive TCP connections is kept connected for a relatively short period of time, and thus allows more efficient management of the proxy's resources. Furthermore, keeping a preemptively established TCP connection for a short period of time prevents involuntary disconnects that otherwise would occur—typically after 5 seconds or so.

In some implementation, a proxy server comprises one or more computer processors, storage media and instructions stored in the storage media that, when executed by the one or more computer processors, cause the one or more computer processors to perform the following: for each time period of a plurality of time periods, the proxy server receives a plurality of active communications connection counts of a plurality of active communications connections that are active within a time period.

Further, the proxy determines a top count of active communications connections from the plurality of active communications connection counts. Then, for each count of the top counts of active communications connections: the proxy determines a relative percentage of pre-connected communications connections, having a particular connection type and included in the count, to be pre-connected by the proxy server and available. Then, the proxy determines whether the relative percentage of the pre-connected communications connections of the particular connection type is already pre-connected by the proxy server and is available.

In response to determining that the relative percentage of the pre-connected communications connections of the particular connection type is not already pre-connected or available within the time period, the proxy pre-connects one or more particular communications connections of the particular connection type until the relative percentage of the pre-connected communications connections of the particular connection type is pre-connected and available.

1.1. Establishing Preemptive TCP Connections

Typically, an active communications connection, of the plurality of active communications connections, has a connection type. The active communications connection, having the connection type, may be defined by at least: an IP address of a plurality of IP addresses of the proxy server, an IP address of a plurality of IP addresses of a certain destination host of a plurality of destination hosts, and a port identifier of a port of a plurality of ports configured on the certain destination host.

The proxy server also determines a top count of active communications connections selected from the plurality of active communications connection counts. The top count of active communications connections are selected based on historical data. For example, suppose that source hosts often request services from a particular destination host. Furthermore, suppose that to facilitate communications with such a particular destination host, the proxy server uses a particular IP address of the proxy server, a particular IP address of the particular destination host and a particular port identifier of a port configured on the particular destination host. Then, according to the current approach, the proxy server may pre-connect in advance a TCP communications connection using the particular IP address of the proxy server, the particular IP address of the particular destination host and the particular port identifier of the port configured on the particular destination host.

In some implementations, the proxy server determines, for each count of the top counts of active communications connections, a relative percentage of pre-connected communications connections, having a particular connection type and included in the count, to be pre-connected by the proxy server and available during the time period.

If the proxy server determines that the relative percentage of the pre-connected communications connections of the particular connection type is not already pre-connected by the proxy server or available within the time period, then the proxy server pre-connects one or more particular communications connections of the particular connection type until the relative percentage of the pre-connected communications connections of the particular connection type is pre-connected and available within the time period.

A particular communications connection, of the one or more particular communications connections having the particular connection type, may be defined by at least: a particular IP address of the proxy server, a particular IP address of a particular destination host of the plurality of destination hosts, and a particular port identifier of a particular port of a plurality of ports configured on the particular destination host.

In some implementations, the plurality of active communications connections that are active within the time period includes communications connections established by the proxy server for customers, and the one or more particular communications connections of the particular connection type are established for the proxy server pro-actively in anticipation of requests from the customers.

1.2. Utilizing Preemptively Established TCP Connections

In some implementations, the proxy server receives a request to establish a first communications connection, between the proxy server and a first destination host, having a first communications connection type.

In response to receiving the request, the proxy server determines whether the first communications connection having the first communications connection type has been pre-connected. If the first communications connection having the first communications connection type has been pre-connected, then the proxy server uses the first communications connection to facilitate communications between the proxy server and the first destination host.

However, if the first communications connection having the first communications connection type has not been pre-connected, then the proxy server establishes the first communications connection having the first communications connection type.

The time period used by the proxy server to determine whether the relative percentage of the pre-connected communications connections of the particular connection type is already pre-connected by the proxy server and is available within the time period can be updated. For example, upon an expiration of the time period, the time period may be updated to an updated time period. Using this approach, the proxy server may repeat the above approach continuously.

Similarly, the plurality of active communications connection counts, for the plurality of active communications connections that are active within the time period, may be updated periodically every time interval. This allows the proxy server to repeatedly test whether the relative percentage of the pre-connected communications connections of the particular connection type is already pre-connected by the proxy server and is available within the time period.

2.0. Proxy Networks

Proxy servers may be implemented as a network of proxy servers. A proxy server network may integrate, for example, a Web proxy server configured to handle Hypertext Transfer Protocol (HTTP) requests received from source hosts, transmit the HTTP requests to destination hosts, receive HTTP responses from the destination hosts, and communicate the HTTP responses to the source hosts. The proxy server network may also integrate Virtual Private Network (VPN) proxy servers that are configured to handle VPN-based requests and responses. Other types of proxy servers may also be integrated in the proxy server networks.

2.1. Functionalities of Proxy Networks

A proxy server acts on behalf of a source host and facilitates communications between the source host and a destination host. A proxy server is usually configured as an intermediary between a source host and a destination host to facilitate implementations of security measures and to act as a shield between the source host and the destination host. Having the proxy as the intermediary allows preventing the source host and the destination host from being aware of the network address of another. The proxy may implement the shield-functionalities by configuring on the proxy, for example, a network address translation functionalities and a multi-hop routing functionalities for a proper routing of the requests and responses between the source and the destination. Functionalities of a proxy server acting as an intermediary may be implemented in a variety of ways. According to one approach, the proxy may hide a network address of a source host from a destination host and hide a network address of the destination host from the source host.

Typically, a network address of a computer implemented in a computer network is defined as an identifier of the computer, and may be included in, for example, headers of communications transmitted to and from the computer. Examples of communications protocols used to route the communications between the computers include the Internet Protocol (IP), the Transmission Control Protocol (TCP), the Hypertext Transfer Protocol (HTTP), the Voice over IP (VoIP) protocol, and the like.

Once a source host establishes a communications connection with a proxy server in a proxy-based network, the proxy establishes a communications connection with a destination host. The two communications connections may be "concatenated" and used as a virtual communications link between the source host and the destination host. The virtual link spans the communications connection between the source host and the proxy server and the communications connection between the proxy server and the destination host.

A proxy has usually assigned a pool of IP addresses that the proxy may use to mask actual IP addresses of other computers. For example, the proxy may mask the IP addresses of source hosts by assigning the proxy's own IP addresses to the IP addresses of the source hosts.

Typically, a TCP proxy, implemented using the SOCKS protocol or the HTTP protocol, connects two TCP communications connections between a source host and a destination host. A typical configuration may be represented as "source host⇔TCP proxy server⇔destination host. The TCP proxy can be used to send data to and receive data from the destination host without revealing the IP address of the source host.

2.2. Example Proxy Network

FIG. 1 is a diagram depicting an example proxy network in which some embodiments are implemented. FIG. 1, the other drawing figures, and all of the description and claims in this disclosure are intended to present, disclose, and claim a technical system and technical methods in which specially programmed computers, using a special-purpose distributed computer system design, execute functions that have not been available before to provide a practical application of computing technology to the problem of machine learning model development, validation, and deployment. In this manner, the disclosure presents a technical solution to a technical problem, and any interpretation of the disclosure or claims to cover any judicial exception to patent eligibility, such as an abstract idea, mental process, method of organizing human activity or mathematical algorithm, has no support in this disclosure and is erroneous.

As shown, a proxy network 100 includes one or more proxy servers 102. Proxy network 100 facilitates communications between a source host 106 and a plurality of destination hosts 108A, 108B . . . , 108N, which may host, for example, a datacenter, a website, and the like.

In FIG. 1, the arrows between the various components represent the directions in which network connections are initiated. The network connections may be established in conformance with the HTTP protocol, the SOCKS protocol, and the like. The types of the communications connections are not to be viewed as limiting the presented approach.

At a high level of abstraction, upon receiving a request from a user of source host 106 to access destination host 108, proxy server 102 establishes a communications connection between proxy 102 and source host 106.

Furthermore, proxy server 102 determines, based on the request, a destination host with which source host 106 wants to communicate. Suppose that source hosts 106 requested services from a destination host 108A. Furthermore, suppose that, based on the request, proxy server 106 determined an IP address (of a plurality of IP addresses of proxy server 102) that proxy server 102 can use to connect to destination host 108A. Furthermore, suppose that proxy server 102 determined an IP address (of a plurality of IP addresses of destination host 108A) that proxy server 102 can use to connect to destination host 108A. Moreover, suppose that proxy server 102 determined a port identifier (of a port of a plurality of ports configured on destination host 108A) that proxy server 102 can use to connect to destination host 108A.

Using the particular IP address of proxy server 102, the particular IP address of destination host 108A, and the particular port identifier of the port configured on destination host 108A, proxy server 102 may establish a communications connection between proxy 102 and destination host 108A, and then bridge both connections to facilitate communications between the user of source host 106 and applications hosted by destination host 108A.

If proxy 102 implements the SOCKS protocol, then a SOCKS proxy endpoint of proxy 102 initiates a network connection between proxy 102 and source host 106, as indicated using an arrow 104A. Furthermore, the SOCKS endpoint of proxy 102 initiates a network connection with a SOCKS endpoint of destination host 108A, as indicated by an arrow 104BA. Once both connections are established, network packets can flow between source host 106 to destination host 108A via proxy 102 in both directions. The network packet flow is not limited to the directions depicted by the arrows.

Similar connections may be established between any source host (including source host 106) and any of destination hosts 108A, 108B, . . . 108N.

Proxy network 100 may be operated by a proxy service provider. For example, the proxy service provider may be a datacenter proxy service provider or a residential proxy service provider. Proxy network 100 may encompass many proxy endpoints in datacenters around the world. A purpose of the proxy provider is for the proxy provider to be able to offer to its users the ability to access destination hosts using network addresses registered in different countries or jurisdictions. This is useful to circumvent network firewall restrictions that prevent access to destination hosts by source hosts that have a source network address registered in a prohibited or unauthorized country or geographic area.

For the purposes of providing a clear example, FIG. 1 depicts only a single source host 106 communicating with a single destination host 108 via proxy network 100. However, proxy network 100 comprising many proxy servers can be used to connect many source hosts with many destination hosts. Thus, source host 106 is intended to be viewed as a representative of many source hosts, and destination host 108 is intended to be viewed as a representative of many destination hosts.

In some embodiments, source host 106 is an end-user personal computing device such as laptop computer, a desktop computer, a workstation computer, a tablet computing device, or a portable electronic computing device such as a smartphone. Source host 106 could also be an application server computer or a network computing device and does not need to be an end-user personal computing device.

Each of destination hosts 108A-108N may be an application server computer or a network computing device configured to implement a website or other online services in conjunction with other destination hosts. More generally, no particular type of computing device or network device is required to implement source host 106 or destination hosts 108A-108N.

Each of the computers implementing source host 106, proxy 102, or destination hosts 108A-108N may have assigned a registered network address. The registered network addresses may be assigned by a regional Internet registry such as the African Network Information Center (AFRINIC), the American Registry for Internet Numbers (ARIN), the Asia-Pacific Network Information Centre (APNIC), the Latin America and Caribbean Network Information Centre (LACNIC), and the Réseaux IP Européens Network Coordination Centre (RIPE NCC). Network address geolocation databases and services exist for resolving a given network address to the geographic region in which it is registered.

Each of destination hosts 108A-108N may be part of a website that uses a network firewall to restrict access to the website to only source network addresses registered in the United States. In that case, if source host 106 uses a network address registered in a European country, then source host 106 may not directly connect to each of destination hosts 108A-108N. The network firewall would prevent the direct network connection because the source network address of the network connection is not registered in the United States. This problem may be solved using proxy network 100 because source host 106 may access the website using proxy network 100.

Source host 106 may access each of destination hosts 108A-108N using proxy network 100 by establishing a communications connection with an endpoint of proxy 102. Since typically, the communications connection is established over a public network such as the Internet, the proxy endpoint may be used to secure the network connection and keep the contents of the information transmitted via the network connection hidden from other users and computers that have access to the public network.

As part of establishing a network connection, source host 106 may specify, for example, a domain name, website name or other network address of a website of destination host 108A with which a user of source host 106 wants to interact. In addition, source host 106 may specify a target geographic area which may be a continent, country, city, region or state, or postal code.

The above-described computer hardware and software are presented for purposes of illustrating the basic underlying components that may be employed in a proxy network. The present approach, however, is not limited to any particular proxy network configuration. The present approach may be implemented in any type of proxy network capable of supporting the methodologies of the described embodiments.

3.0. TCP Three-Way-Handshake Process

Figure 2:
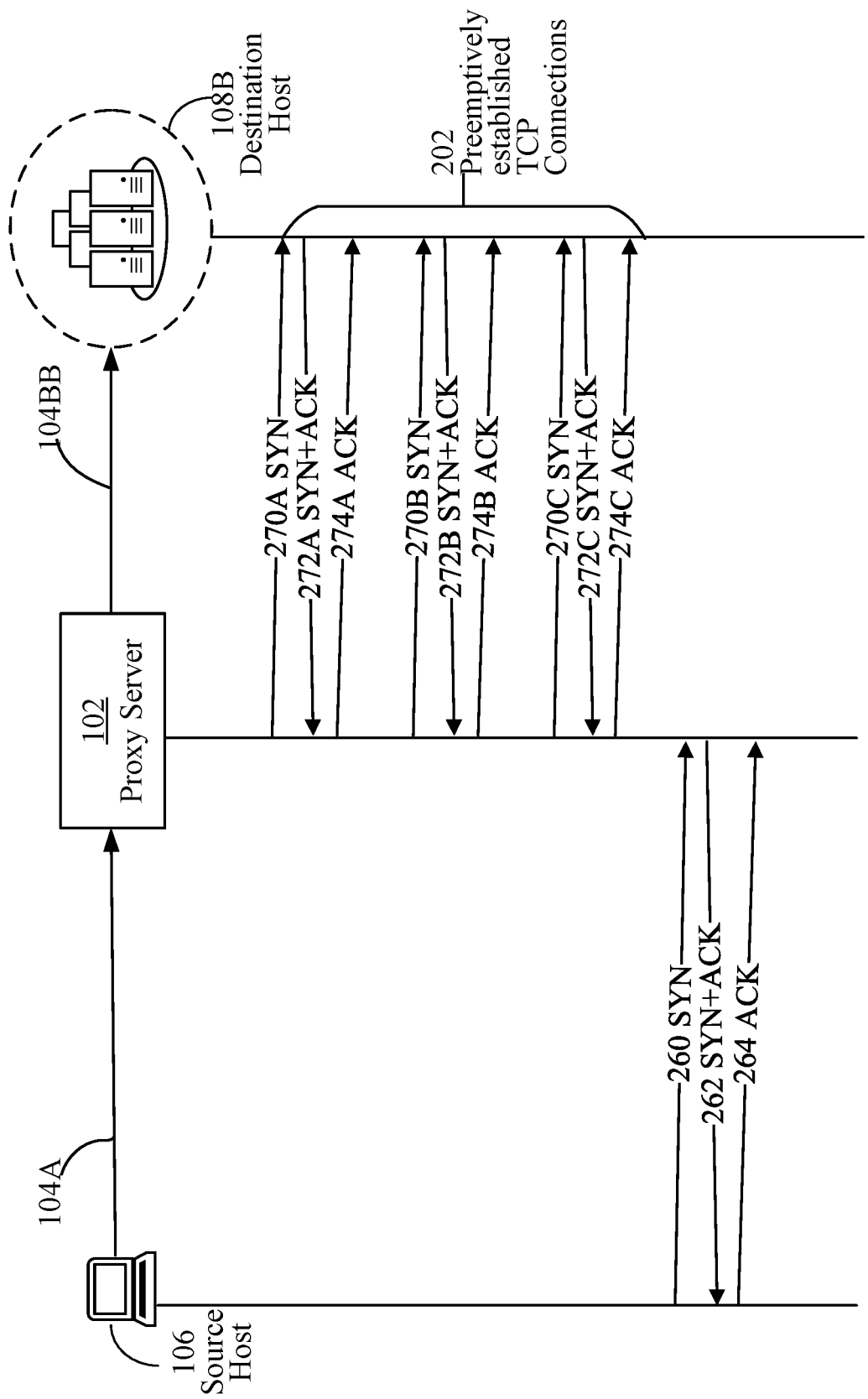
FIG. 2 is a diagram depicting an example process for establishing preemptive communications connections between a proxy server and a destination host and establishing a communications connection between the source host and the proxy server according to some embodiments.

FIG. 2 is a diagram depicting an example process for establishing preemptive communications connections between a proxy server and a destination host and establishing a communications connection between the source host and the proxy server according to some embodiments.

In some implementations, each pre-connected TCP connection (i.e., each preemptively established TCP communications connection) is characterized by the following variables: a proxy IP address, a destination host IP address, and a destination host port identifier of a port implemented on the destination host. Depending on implementation, a typical proxy may have about 2000 available IP addresses, a typical destination host may have about 10 available IP addresses and about 65k ports.

When choosing a pre-connected TCP communications connection, all of the above 3 variables have to match. That means that if a particular TCP communications connection characterized by the particular three variables is requested, then the proxy server need to check whether the proxy server has already preemptively established a TCP communications connection that is characterized by the corresponding, particular three variables.

In the example depicted in FIG. 2, the communications connections are TCP communications connections. For simplicity of the description, each communications connection between proxy server 102 and destination host 108B is identified by {IPAddX, IPAddY, PortIDZ}, where IPAddX identifies a particular IP address of the proxy server, IPAddY identifies a particular IP address of a particular destination host, and PortIDZ identifies a particular port identifier of a particular port implemented on the particular destination host.

According to the presented approach, a proxy server may establish, in advance, one or more preemptive TCP communications connections with one or more ports established on each destination host of one or more destination hosts. Then, upon receiving requests from source hosts, the proxy server establishes TCP communications connections with the corresponding source hosts, selects corresponding TCP communications connections—if such are available—preemptively established between the proxy server and corresponding destination hosts to facilitate communications between the source hosts and corresponding destination hosts.

On some, relatively rare occasions, however, the proxy server may determine that a corresponding preemptive TCP communications connection is not available at the moment. In such situations, the proxy server establishes the corresponding communications connection between the proxy server and the corresponding port of the corresponding destination host, and concatenates the TCP communications connection between the source host and the proxy server with the corresponding TCP communications connection between the proxy server and the corresponding port of the corresponding destination host to facilitate communications between the source hosts and the corresponding destination host.

3.1. TCP Three-Way-Handshake Process with a Destination

A TCP communications connection may be established using, for example, a three-way-handshake process. One or more preemptive TCP communications connections between a proxy server and one or more ports of one or more destination hosts may be established using, for example, a three-way-handshake process for each of the communications connections. As shown in FIG. 2, to establish, for example, three preemptive TCP communications connections 104BB between proxy server 102 and, for example, three different ports of destination host 108B, proxy server 102 may sequentially initiate three three-way-handshake processes with destination host 108B.

Suppose that proxy server 102 determined that a TCP communications connection from an IP address 2 (IPAdd2) of the proxy to an IP address 2 (IPAdd2) of destination host 108B at a port having an identifier 5 (PortID5) of destination host 108B is requested quite often (e.g., more frequently than a preset frequency threshold). To preemptively establish such a TCP communications connection {IPAdd2, IPAdd2, PortID5}, proxy server 102 may initiate a three-way-handshake process with destination host 108B even before such a TCP connection is indeed requested.

To initiate a preemptive TCP communications connection {IPAdd2, IPAdd2, PortID5}, proxy server 102 may transmit a SYN request 270A to destination host 108B. This may be implemented by setting a SYN flag to 1 and sending a message with the SYN flag to destination host 108B.

In response, destination host 108A may reply with a SYN+ACK message 272B to proxy server 102.

After receiving SYN+ACK message 262B from destination host 108A with a flag set to "1," proxy server 102 also may also advertise its window size and maximum segment size to proxy 102. After completion of this step, the connection {IPAdd2, IPAdd2, PortID5} is preemptively established between proxy server 102 and the port having PortID5 of destination host 108B.

Suppose that proxy server 102 determined that a TCP communications connection from an IP address 3 (IPAdd3) of the proxy to an IP address 1 (IPAdd1) of destination host 108B at a port having an identifier 4 (PortID4) of destination host 108B is requested quite often (e.g., more frequently than a preset frequency threshold). To preemptively establish such a TCP communications connection {IPAdd3, IPAdd1, PortID4}, proxy server 102 may initiate a three-way-handshake process with destination host 108B even before such a TCP connection is indeed requested.

To initiate a preemptive TCP communications connection {IPAdd3, IPAdd1, PortID4}, proxy server 102 may transmit a SYN request 270B to destination host 108B. This may be implemented by setting a SYN flag to 1 and sending a message with the SYN flag to destination host 108A.

In response, destination host 108A may reply with a SYN+ACK message 272B to proxy server 102.

After receiving SYN+ACK message 262B from destination host 108B with a flag set to "1," proxy server 102 also may also advertise its window size and maximum segment size to proxy 102. After completion of this step, the connection {IPAdd3, IPAdd1, PortID4} is preemptively established between proxy server 102 and the port having PortID4 of destination host 108B.

Suppose that proxy server 102 determined that a TCP communications connection from an IP address 6 (IPAdd7) of the proxy to an IP address 4 (IPAdd4) of destination host 108B at a port having an identifier 6 (PortID6) of destination host 108B is requested quite often (e.g., more frequently than a preset frequency threshold). To preemptively establish such a TCP communications connection {IPAdd7, IPAdd4, PortID6}, proxy server 102 may initiate a three-way-handshake process with destination host 108B even before such a TCP connection is indeed requested.

To initiate a preemptive TCP communications connection {IPAdd7, IPAdd4, PortID6}, proxy server 102 may transmit a SYN request 270A to destination host 108B. This may be implemented by setting a SYN flag to 1 and sending a message with the SYN flag to destination host 108B.

In response, destination host 108A may reply with a SYN+ACK message 272B to proxy server 102.

After receiving SYN+ACK message 262B from destination host 108A with a flag set to "1," proxy server 102 also may also advertise its window size and maximum segment size to proxy 102. After completion of this step, the connection {IPAdd7, IPAdd4, PortID6} is preemptively established between proxy server 102 and the port having PortID6 of destination host 108B.

The above examples illustrate one of many ways of establishing the preemptive TCP communications connection{IPAdd2, IPAdd2, PortID5}, the preemptive TCP communications connections {IPAdd3, IPAdd1, PortID4}, and the preemptive TCP communications connection {IPAdd7, IPAdd4, PortID6}. A similar approach may be implemented to preemptively establish TCP communications connections between proxy server 102 and other destination hosts, including destination hosts 108A, 108N, and the like.

3.2. TCP Three-Way-Handshake Process with a Source

As shown in FIG. 2, to initiate a three-way-handshake process with proxy server 102, source host 106 transmits a SYN request 260 to proxy server 102. This may be implemented by setting a SYN flag to 1 and sending a message with the SYN flag to proxy server 102.

In response, proxy server 102 replies with a SYN+ACK message 262 to source host 106.

After receiving SYN+ACK 262 from the proxy, source host 106 sends an ACK message 264 with a flag set to "1." The source host also advertises its window size and maximum segment size to proxy 102. After completion of this step, the connection is established from source host 106 to proxy server 102.

4.0. Establishing Preemptive TCP Connections to Reduce Latency for Proxies

Typically, each proxy server that has implemented multiple proxy IP addresses may have a specific configuration and corresponding limitations on the configuration. The specific configuration may be adjusted by a system administrator based on the available system and network resources. The specific configuration of a proxy may include a specification of a number of pre-connected TCP connections that the proxy may reasonably maintain at a given time period. Typically, the number of the pre-connected TCP connections that a proxy may support is about 10,000 connections.

Furthermore, the configuration may specify a maximum time a pre-connected TCP can be maintained by the proxy before the proxy terminates the connection. Typically, the life-time-of-a-connection is about 5 seconds.

Moreover, the configuration may specify a size of a statistics window during which the information about the TCP communications connections simultaneously supported by the proxy can be polled. Typically, the size of the statistics window is about 5 minutes. That means that the proxy server may provide information about the TCP communications connections simultaneously supported by the proxy, for example, every 5 minutes.

In other implementations, the configuration proxy may include other parameters and other parameter values.

4.1. Determining which Connections to Pre-Connect

In order to increase the chance that the proxy will use pre-connected TCP communications connections and therefore will reduce the latency for the proxy, the proxy uses historical data, including statistics window data available at the proxy, to determine which TCP communications connections are worth pre-connecting, i.e., preemptively. To determine such TCP communications connections, the proxy uses the statistics window data to determine which TCP communications connections have been most often requested recently. To determine that, the proxy is analyzing the statistics window data to determine the history of connections created by the users of server hosts when the server hosts requested services from destination hosts via the proxy.

Figure 3A:
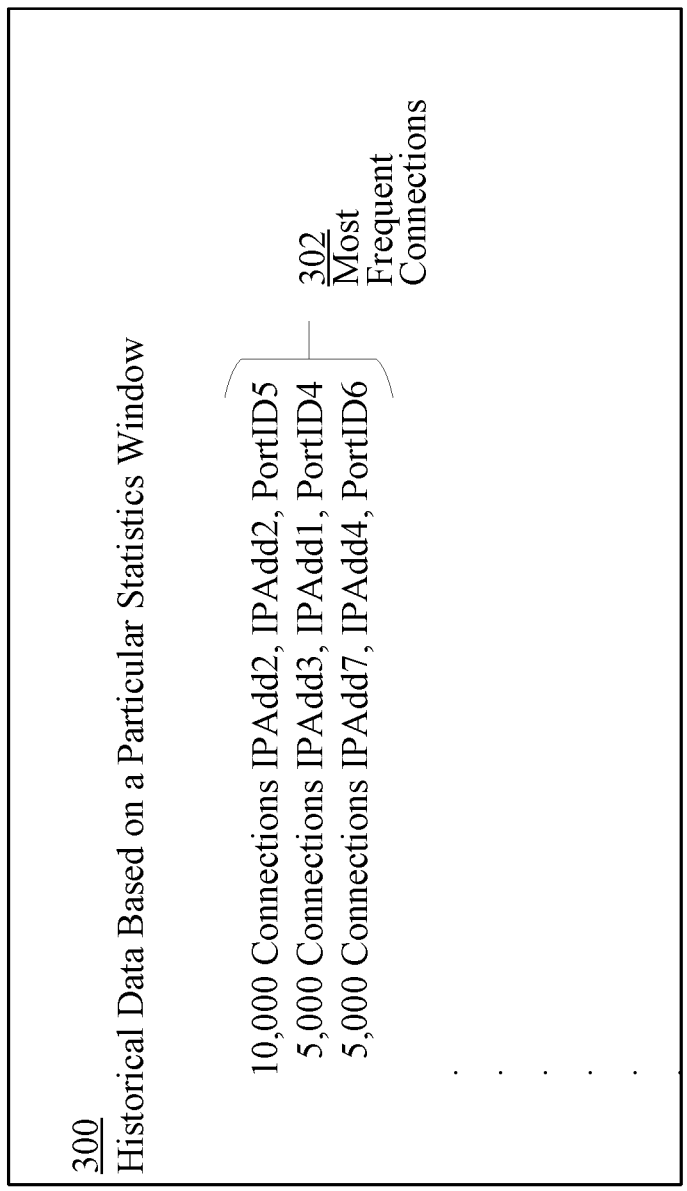
FIG. 3A is a diagram depicting an example of historical data from a particular statistics window according to some embodiments.

FIG. 3A is a diagram depicting an example of historical data from a particular statistics window according to some embodiments. Suppose that, based on a particular statistics window 300, a proxy server has gathered connection statistics information within the particular statistics window.

Suppose that within a particular time period (for example, 5 minutes) the most active TCP communications connections that the proxy supported included:

10,000 TCP {IPAdd2, IPAdd2, PortID5} connections, which are the connections from an IPAdd2 of the proxy to an IPAdd2 of destination host 108B at a port having a PortID5 implemented on destination host 108B, 5,000 TCP {IPAdd3, IPAdd11, PortID4} connections, which are the connections from an IPAdd3 of the proxy to an IPAdd11 of destination host 108A at a port having a PortID4 implemented on destination host 109A, 5,000 TCP {IPAdd7, IPAdd44, PortID6} connections, which are the connections from an IPAdd7 of the proxy to an IPAdd44 of destination host 108N at a port having a PortID6 implemented on destination host 108N.

In the depicted example, the total number of TCP communications connections that the proxy was supporting within the particular period of time was 20,000.

In some implementations, the proxy uses the statistics window data to determine which TCP communications connections should be pre-connected in advance in the future. Furthermore, since the proxy server may pre-connect only a predetermined total number of preemptive connections, the proxy may use a proportion rule to determine which TCP connections should be pre-connected and how many of them should be pre-connected. For example, if the proxy establishes that three particular TCP connections were most active in the past, then the proxy may pre-connect each of three TCP connections of the particular type in the ratio corresponding to the historical activity data.

Referring again to the above example, since there were three most active connections: {IPAdd2, IPAdd2, PortID5}, {IPAdd3, IPAdd1, PortID4}, and {IPAdd7, IPAdd4, PortID6} within the particular time period, the {IPAdd2, IPAdd2, PortID5} was active 10,000 times, the {IPAdd3, IPAdd1, PortID4} was active 5,000 times, and the {IPAdd7, IPAdd4, PortID6} was active 5,000 times, then the ratio of the corresponding TCP connections is 2:1:1. Hence, the proxy may apply a proportion rule to determine that:

50% of pre-connected TCP connections should be {IPAdd2, 1PAdd2, PortID5} connections between the proxy and destination host 108B, 25% of pre-connected TCP connections should be {IPAdd3, IPAdd1, PortID4} connections between the proxy and destination host 108A, and 25% of pre-connected TCP connections should be {IPAdd7, IPAdd4, PortID6} connections between the proxy and destination host 108N.

4.2. Pre-Connecting Connections Based on Historical Data

Figure 3B:
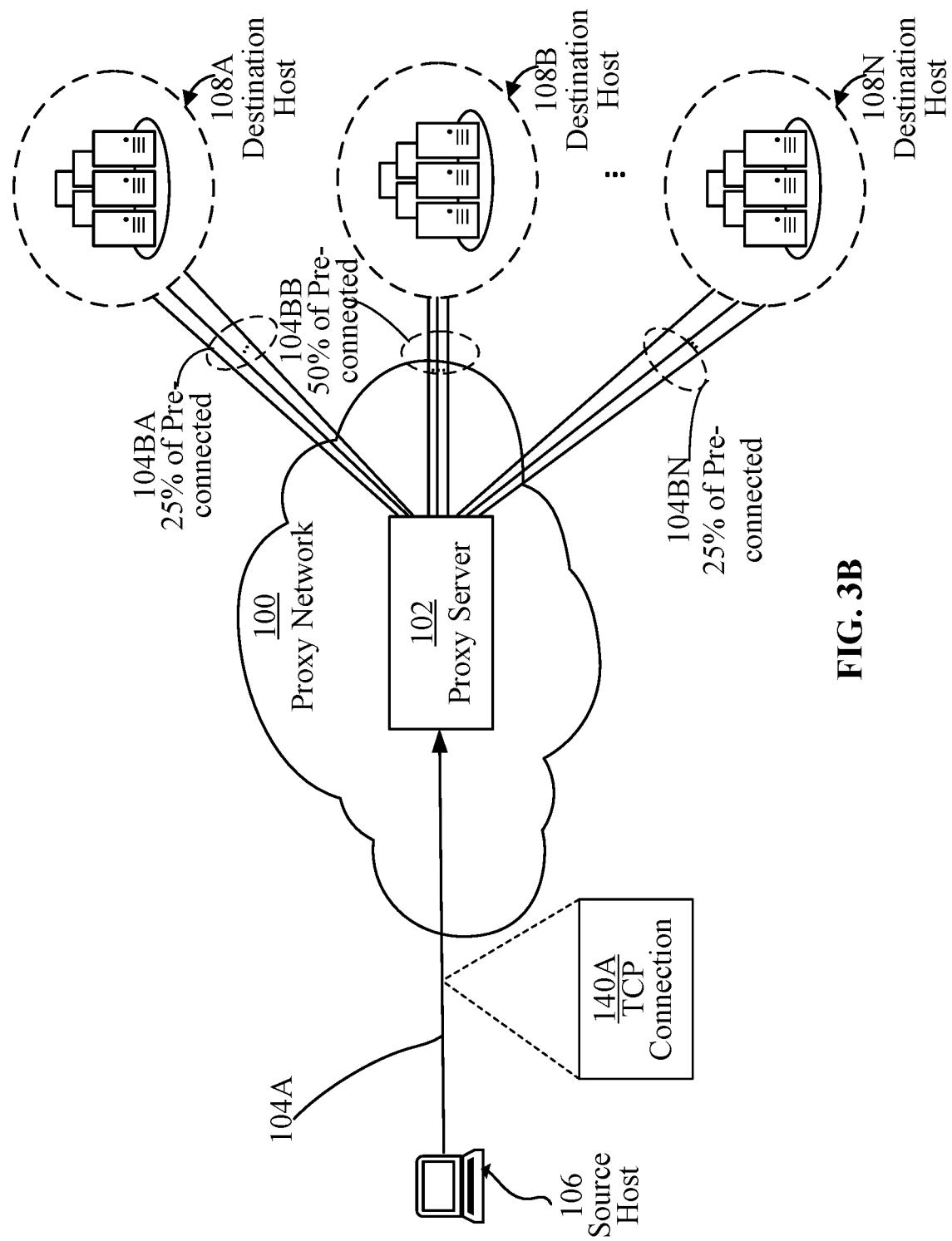
FIG. 3B is a diagram depicting an example proxy network with example counts of pre-connected TCP connections with destination hosts according to some embodiments.

FIG. 3B is a diagram depicting an example proxy network with example counts of pre-connected TCP connections with destination hosts according to some embodiments.

Suppose that proxy server 102 determined, based on statistics window data, that the relative percentages of the most active TCP communications connections was {IPAdd2, IPAdd2, PortID5} between the proxy and destination host 108B, {IPAdd3, IPAdd1, PortID4} between the proxy and destination host 108A, and {IPAdd7, IPAdd4, PortID6} between the proxy and destination host 108N was 2:1:1. Subsequently, the proxy applied a proportion rule to determine that:

5,000 (which is 50% of 10,000) pre-connected TCP connections should be {IPAdd2, IPAdd2, PortID5} connections between the proxy and destination host 108B, 2,500 (which is 25% of 10,000) pre-connected TCP connections should be {IPAdd3, IPAdd1, PortID4} connections between the proxy and destination host 108A, and 2,500 (which is 25% of 10,000) pre-connected TCP connections should be {IPAdd7, IPAdd4, PortID6} connections between the proxy and destination host 108N.

Suppose that the proxy may simultaneously support 10,000 pre-connected TCP connections within a given time period. Therefore, 5,000 of pre-connected TCP connections should be {IPAdd2, IPAdd2, PortID5} connections 104BB between the proxy and destination host 108B, 2,500 of pre-connected TCP connections should be {IPAdd3, IPAdd1, PortID4} connections 104BA between the proxy and destination host 108A, and 2,500 of pre-connected TCP connections should be {IPAdd7, IPAdd4, PortID6} connections 104BN between the proxy and destination host 108N.

4.3. Miscellaneous Cases

In some situations, however, a proxy server may receive a request from a source host for facilitating communications with a destination host (having a particular IP address and a particular PortID) for which a TCP communications connection has not been pre-connected. Assuming that the proxy has analyzed their statistics window data thoroughly and logically, such situations should not happen often. Nevertheless, when they happen, the proxy establishes the particular TCP communications connections between the proxy and the destination host (having a particular IP address and a particular PortID) and then concatenates that connection with, for example, a TCP communications connection 140A, shown in FIG. 3B, to facilitate communications between the source host and the destination host.

5.0. Flow Chart for Preemptively Establishing TCP Communications Connections

Figure 4:
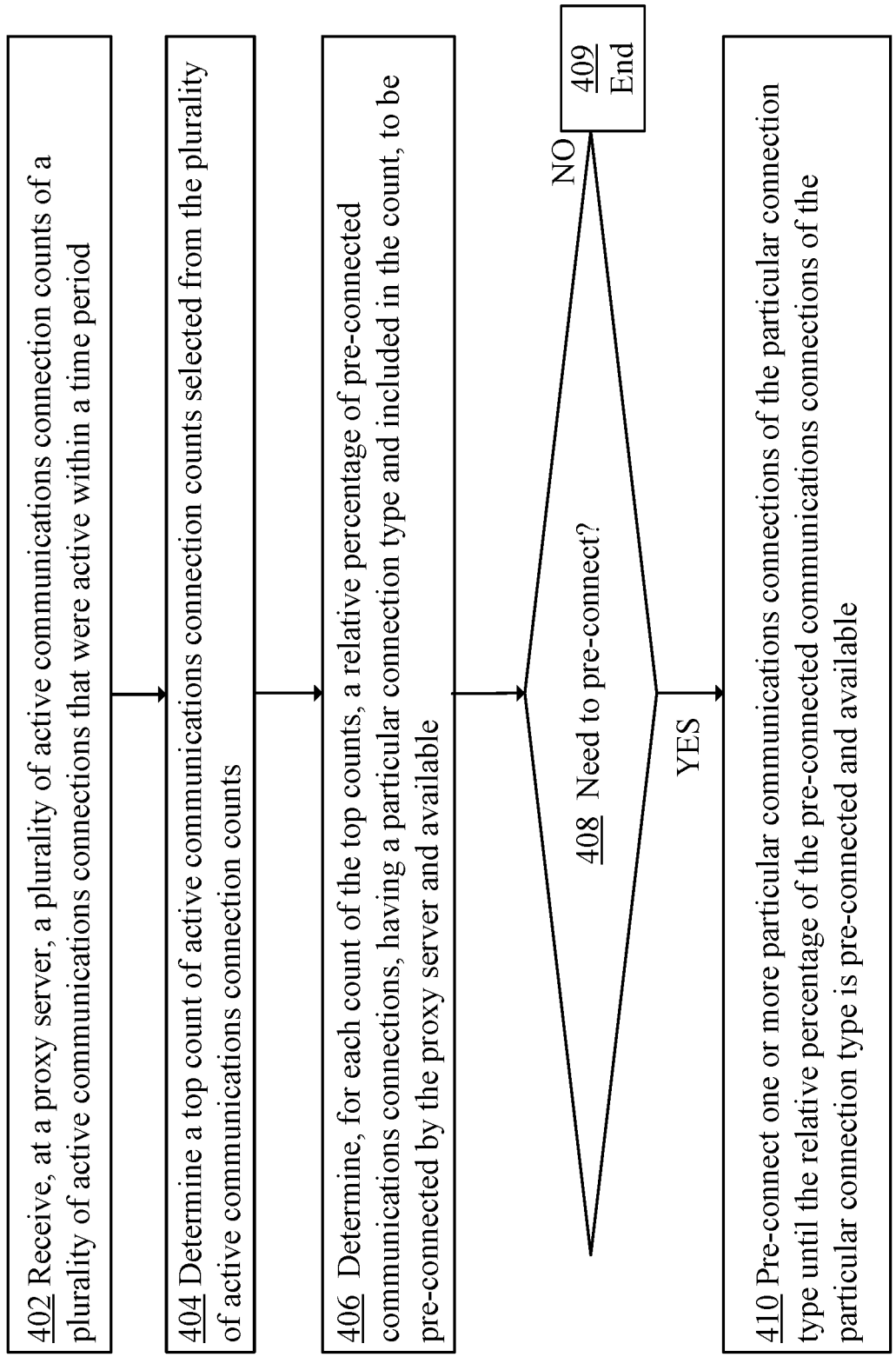
FIG. 4 is a flow chart depicting an example implementation of a process for preemptively establishing TCP communications connections according to some embodiments.

FIG. 4 is a flow chart depicting an example implementation of a process for preemptively establishing TCP communications connections according to some embodiments. The steps depicted in FIG. 4 are performed by proxy server 102 before source hosts attempt to establish TCP communications connections with destination hosts. The steps of FIG. 4 describe the process of determining, based on statistics window data (i.e., historical data of TCP communications connections supported by the proxy), which TCP communications connections are most frequently requested, determining whether such TCP connections are pre-connected presently, and if not, pre-connected a certain amount of such TCP connections before they might be requested by the source hosts.

In step 402, a proxy server receives a plurality of active communications connection counts of a plurality of active communications connections that were active within a particular time period. That information may be received based on statistics window historical data available to the proxy.

In some implementations, the plurality of active communications connections that are active within the time period includes the communications connections established by the proxy server for customers. Furthermore, each active communications connection is usually active throughout a particular time period and then it is terminated unless the proxy requests that the connection remains active.

Each of the active communications connections, of the plurality of active communications connections, has a connection type. The connection type may be defined by at least: an IP address of a plurality of IP addresses of the proxy server, an IP address of a plurality of IP addresses of a certain destination host of a plurality of destination hosts, and a port identifier of a port of a plurality of ports configured on the certain destination host.

Referring to the examples described above, examples of TCP communications connections may include TCP {IPAdd2, IPAdd2, PortID5} connections, which are the connections from an IPAdd2 of the proxy to an IPAdd2 of destination host 108B at a port having a PortID5 implemented on destination host 108B; {IPAdd3, IPAdd1, PortID4} connections, which are the connections from an IPAdd3 of the proxy to an IPAdd11 of destination host 108A at a port having a PortID4 implemented on destination host 108A; and {IPAdd7, IPAdd4, PortID6} connections, which are the connections from an IPAdd7 of the proxy to an IPAdd44 of destination host 108N at a port having a PortID6 implemented on destination host 108N.

In step 404, the proxy determines a top count of active communications connections selected from the plurality of active communications connection counts. Referring to the examples described above, suppose that the historical data indicate that, within the particular time period, there were 10,000 of TCP {IPAdd2, IPAdd2, PortID5} connections, 5,000 of TCP {IPAdd3, IPAdd11, PortID4} connections, and 5,000 of TCP {IPAdd7, IPAdd44, PortID6} connections, which are the connections from an IPAdd7 of the proxy to an IPAdd44 of destination host 108N at a port having a PortID6 implemented on destination host 108N.

In step 406, the proxy server determines, for each count of the top counts, a relative percentage of pre-connected communications connections, having a particular connection type and included in the count, to be pre-connected by the proxy server and available. Referring to the examples described above, since there were three most active connections: {IPAdd2, IPAdd2, PortID5}, {IPAdd3, IPAdd1, PortID4}, and {IPAdd7, IPAdd4, PortID6} within the particular time period, the {IPAdd2, IPAdd2, PortID5} was active 10,000 times, the {IPAdd3, IPAdd1, PortID4} was active 5,000 times, and the {IPAdd7, IPAdd4, PortID6} was active 5,000 times, then the relative percentages of the corresponding TCP connections is 2:1:1.

In step 408, the proxy server determines, for each count of the top counts, whether the relative percentage of the pre-connected communications connections of the particular connection type is already pre-connected by the proxy server and is available.

In some implementations, the one or more particular communications connections of the particular connection type are established, by the proxy server, pro-actively and in anticipation of requests from the customers.

As above, a particular communications connection, of the one or more particular communications connections having the particular connection type, is defined by at least: a particular IP address of the proxy server, a particular IP address of a particular destination host of a plurality of destination hosts, and a particular port identifier of a particular port of a plurality of ports configured on the particular destination host.

Referring again to the above example, the proxy server may apply the proportion rule 2:1:1 to determine that 5,000 (which is 50% of 10,000) pre-connected TCP connections should be {IPAdd2, IPAdd2, PortID5} connections between the proxy and destination host 108B; 2,500 (which is 25% of 10,000) pre-connected TCP connections should be {IPAdd3, IPAdd1, PortID4} connections between the proxy and destination host 108A; and 2,500 (which is 25% of 10,000) pre-connected TCP connections should be {IPAdd7, IPAdd4, PortID6} connections between the proxy and destination host 108N.

If, in step 408, the proxy server determines that, for the particular connection type, the proxy has not pre-connected sufficient amount of TCP communications connections, then in step 410, the proxy server pre-connects one or more particular communications connections of the particular connection type until the relative percentage of the pre-connected communications connections of the particular connection type is pre-connected and available. Otherwise, the proxy proceeds to step 409, and then repeats the process from step 402.

Referring again to the above examples, if the proxy determines, for example, that the proxy does not have 5,000 (which is 50% of 10,000) pre-connected TCP {IPAdd2, IPAdd2, PortID5} connections between the proxy and destination host 108B, but it has only 2,000 TCP connections of that type, then the proxy server may, in step 410, establish the 3,000 of TCP {IPAdd2, IPAdd2, PortID5} connections between the proxy and destination host 108B.

The above process is repeated for each time period of a plurality of time. For example, since the statistics window data in some implementations are available every 5 minutes, the above process may be repeated every 5 minutes, or so. However, if the proxy determines that executing the above process is employing too many resources of the proxy, and thus it is too taxing on the proxy, then the proxy may repeat the above process less frequently than every 5 minutes.

Figure 5:
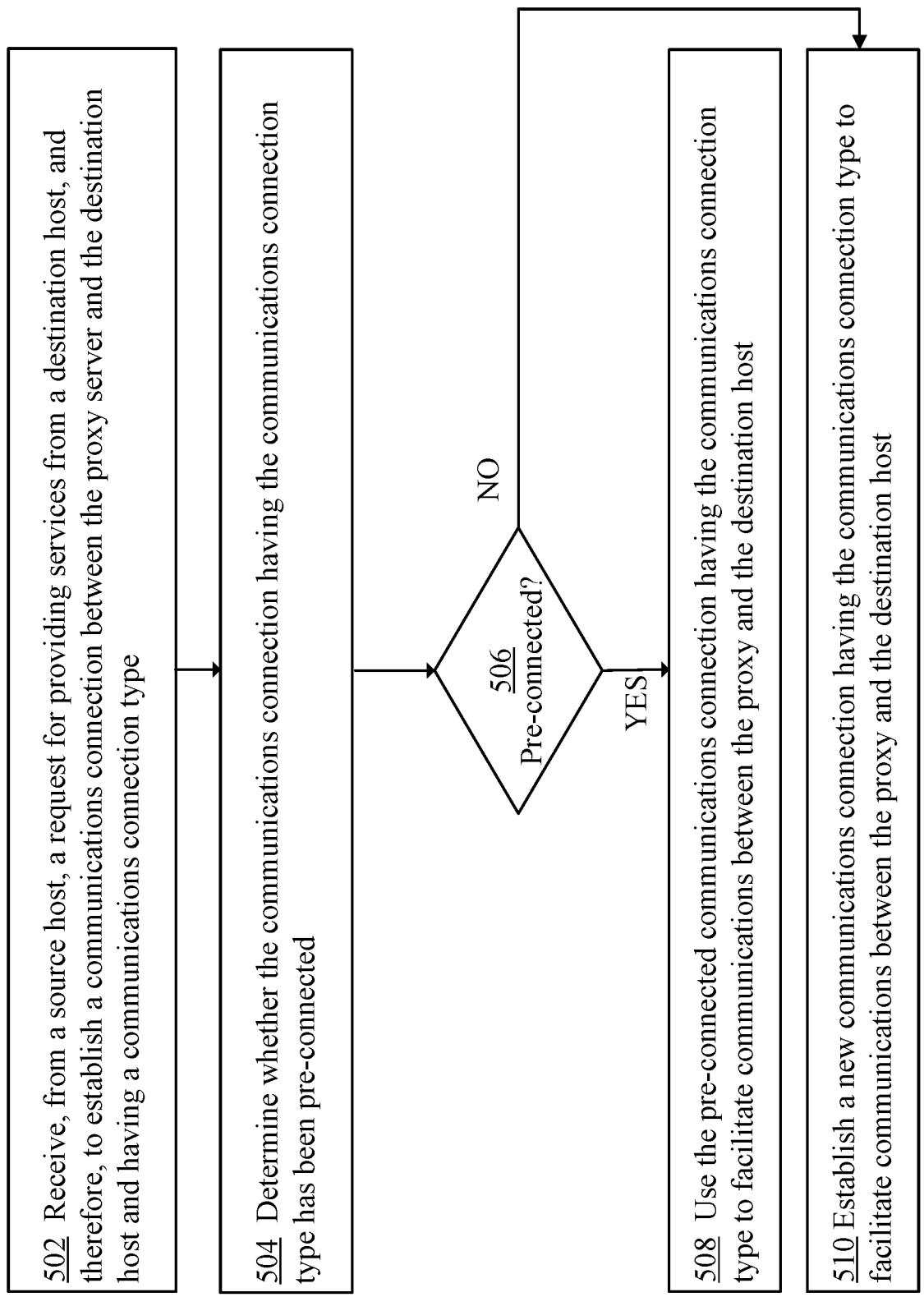
FIG. 5 is a flow chart depicting an example implementation of a process for utilizing preemptively established TCP communications connections according to some embodiments.

6.0. Flow Chart for Utilizing Preemptively Established TCP Communications Connections FIG. 5 is a flow chart depicting an example implementation of a process for utilizing preemptively established TCP communications connections according to some embodiments. The steps depicted in FIG. 5 are performed by proxy server 102 once source hosts attempt to establish TCP communications connections with destination hosts. The steps of FIG. 5 describe the process of determining, whether TCP communications connections, between the proxy and corresponding destination hosts, that are needed to facilitate the requests from the source hosts to communicate with the destination hosts have been already pre-connected, and if they have, then the proxy utilizes the corresponding pre-connected TCP connections between the proxy and the corresponding destination hosts, and thus latency in processing the requests received from the source hosts is reduced if not eliminated. If, however, they have not been pre-connected yet, then the proxy establishes the corresponding TCP connections between the proxy and the corresponding destination hosts, and thus incurs some latency in processing the requests received from the source hosts.

In step 502, a proxy server receives, from a source host, a request for providing services from a destination host, and therefore, to establish a communications connection between the proxy server and the destination host and having a communications connection type.

As before, a connection type may be defined by at least: an IP address of a plurality of IP addresses of the proxy server, an IP address of a plurality of IP addresses of a certain destination host of a plurality of destination hosts, and a port identifier of a port of a plurality of ports configured on the certain destination host.

In step 504, the proxy determines whether the requested communications connection having the communications connection having the communications connection type has been pre-connected. If, in step 506, the proxy determines that the requested communications connection having the communications type has been already pre-connected (e.g., pre-connected as shown in FIG. 4), then the proxy server proceeds to step 508, in which the proxy server uses the pre-connected communications connection to facilitate communications between the proxy server and the destination host, and thus to allow providing the services from the destination host to the source host.

However, if in step 506, the proxy determines that the requested communications connection having the communications connection type has not been pre-connected, then, in step 510, the proxy establishes a new TCP communications connection of the communications connection type and uses that new TCP connection to facilitate communications between the proxy server and the destination host, and thus to allow providing the services from the destination host to the source host.

7.0. Hardware Implementation

According to some embodiments of the present approach, the techniques described herein are implemented by at least one computer system. The techniques may be implemented in whole or in part using a combination of at least one server computer or other computer systems that are coupled using a network, such as a packet data network. The computer systems may be hard-wired to perform the techniques or may include digital electronic devices such as at least one application-specific integrated circuit (ASIC) or field programmable gate array (FPGA) that is persistently programmed to perform the techniques or may include at least one general purpose hardware processor programmed to perform the techniques pursuant to program instructions in firmware, memory, other storage, or a combination. Such computer systems may also combine custom hard-wired logic, ASICs, or FPGAs with custom programming to accomplish the described techniques.

The computer systems may be server computers, workstations, personal computers, portable computer systems, handheld devices, mobile computing devices, wearable devices, body mounted or implantable devices, smartphones, smart appliances, internetworking devices, autonomous or semi-autonomous devices such as robots or unmanned ground or aerial vehicles, any other electronic device that incorporates hard-wired or program logic to implement the described techniques, one or more virtual computing machines or instances in a data center, or a network of server computers or personal computers.

Figure 6:
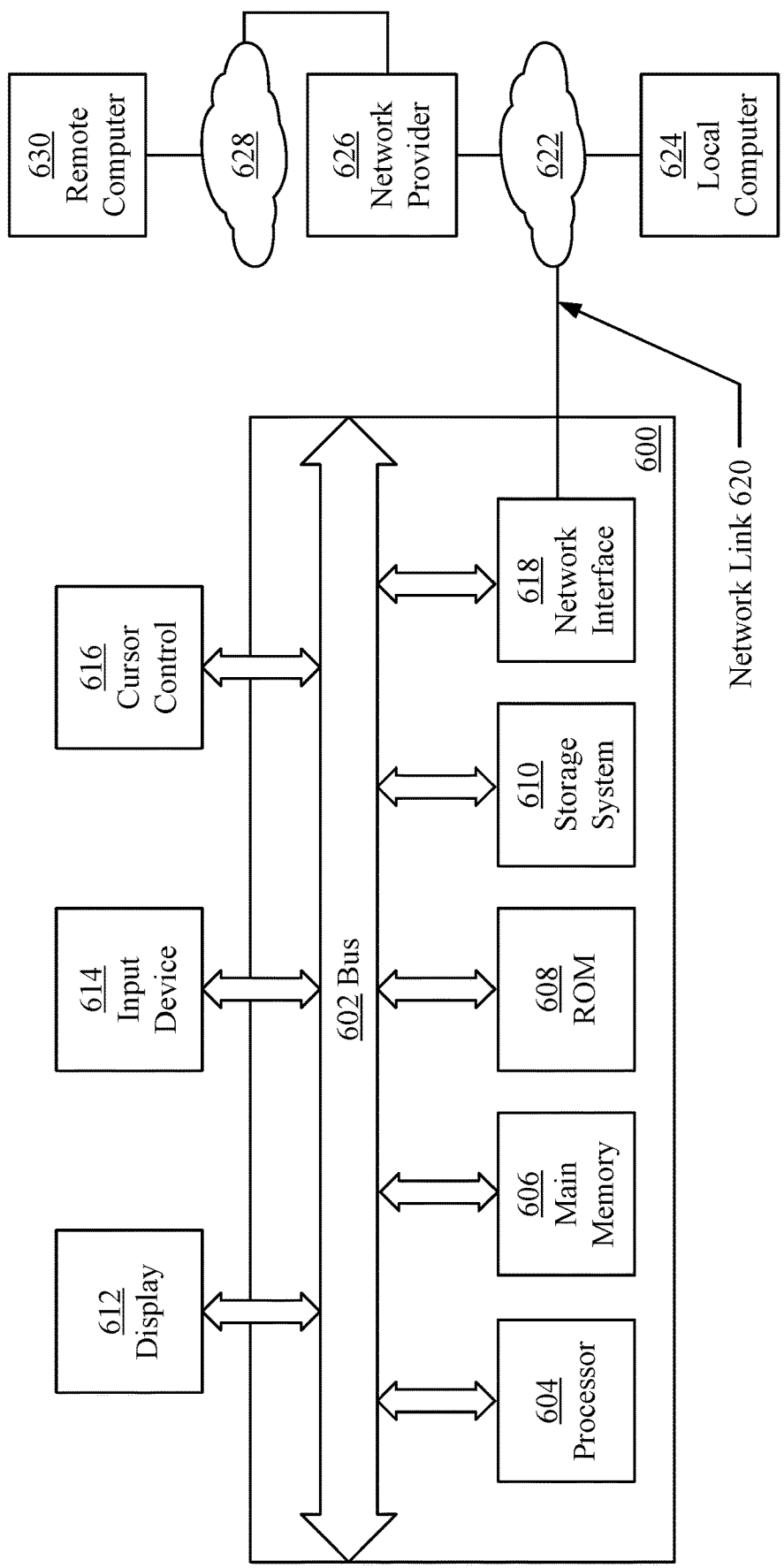
FIG. 6 is a block diagram depicting a computer system upon which some embodiments may be implemented.

FIG. 6 is a block diagram that illustrates an example computer system with which some embodiments may be implemented. In the example of FIG. 6, a computer system 600 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 600 includes an input/output (I/O) subsystem 602 which may include a bus or other communication mechanism(s) for communicating information or instructions between the components of the computer system 600 over electronic signal paths. The I/O subsystem 602 may include an I/O controller, a memory controller and at least one I/O port. The electronic signal paths are represented schematically in the drawings, for example as lines, unidirectional arrows, or bidirectional arrows.

At least one hardware processor 604 is coupled to I/O subsystem 602 for processing information and instructions. Hardware processor 604 may include, for example, a general-purpose microprocessor or microcontroller or a special-purpose microprocessor such as an embedded system or a graphics processing unit (GPU) or a digital signal processor or ARM processor. Processor 604 may comprise an integrated arithmetic logic unit (ALU) or may be coupled to a separate ALU.

Computer system 600 includes one or more units of memory 606, such as a main memory, which is coupled to I/O subsystem 602 for electronically digitally storing data and instructions to be executed by processor 604. Memory 606 may include volatile memory such as various forms of random-access memory (RAM) or other dynamic storage device. Memory 606 also may be used for storing temporary variables or other intermediate information during execution of instructions to be executed by processor 604. Such instructions, when stored in non-transitory computer-readable storage media accessible to processor 604, can render computer system 600 into a special-purpose machine that is customized to perform the operations specified in the instructions.

Computer system 600 further includes non-volatile memory such as read only memory (ROM) 608 or other static storage device coupled to I/O subsystem 602 for storing information and instructions for processor 604. The ROM 608 may include various forms of programmable ROM (PROM) such as erasable PROM (EPROM) or electrically erasable PROM (EEPROM). A unit of persistent storage 610 may include various forms of non-volatile RAM (NVRAM), such as FLASH memory, or solid-state storage, magnetic disk or optical disk such as CD-ROM or DVD-ROM and may be coupled to I/O subsystem 602 for storing information and instructions. Storage 610 is an example of a non-transitory computer-readable medium that may be used to store instructions and data which when executed by the processor 604 cause performing computer-implemented methods to execute the techniques herein.

The instructions in memory 606, ROM 608 or storage 610 may comprise one or more sets of instructions that are organized as modules, methods, objects, functions, routines, or calls. The instructions may be organized as one or more computer programs, operating system services, or application programs including mobile apps. The instructions may comprise an operating system or system software; one or more libraries to support multimedia, programming or other functions; data protocol instructions or stacks to implement TCP/IP, HTTP or other communication protocols; file processing instructions to interpret and render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language (SQL) or NoSQL, an object store, a graph database, a flat file system or other data storage.

Computer system 600 may be coupled via I/O subsystem 602 to at least one output device 612. In some embodiments, output device 612 is a digital computer display. Examples of a display that may be used in some embodiments include a touch screen display or a light-emitting diode (LED) display or a liquid crystal display (LCD) or an e-paper display. Computer system 600 may include other type(s) of output devices 612, alternatively or in addition to a display device. Examples of other output devices 612 include printers, ticket printers, plotters, projectors, sound cards or video cards, speakers, buzzers or piezoelectric devices or other audible devices, lamps or LED or LCD indicators, haptic devices, actuators, or servos.

At least one input device 614 is coupled to I/O subsystem 602 for communicating signals, data, command selections or gestures to processor 604. Examples of input devices 614 include touch screens, microphones, still and video digital cameras, alphanumeric and other keys, keypads, keyboards, graphics tablets, image scanners, joysticks, clocks, switches, buttons, dials, slides, or various types of sensors such as force sensors, motion sensors, heat sensors, accelerometers, gyroscopes, and inertial measurement unit (IMU) sensors or various types of transceivers such as wireless, such as cellular or Wi-Fi, radio frequency (RF) or infrared (IR) transceivers and Global Positioning System (GPS) transceivers.

Another type of input device is a control device 616, which may perform cursor control or other automated control functions such as navigation in a graphical interface on a display screen, alternatively or in addition to input functions. Control device 616 may be a touchpad, a mouse, a trackball, or cursor direction keys for communicating direction information and command selections to processor 604 and for controlling cursor movement on display 612. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 614 may include a combination of multiple different input devices, such as a video camera and a depth sensor.

In some embodiments, computer system 600 may comprise an internet of things (IoT) device in which one or more of the output devices 612, input device 614, and control device 616 are omitted. In some embodiments, the input device 614 may comprise one or more cameras, motion detectors, thermometers, microphones, seismic detectors, other sensors or detectors, measurement devices or encoders and the output device 612 may comprise a special-purpose display such as a single-line LED or LCD display, one or more indicators, a display panel, a meter, a valve, a solenoid, an actuator, or a servo.

When computer system 600 is a mobile computing device, input device 614 may comprise a global positioning system (GPS) receiver coupled to a GPS module that is capable of triangulating to a plurality of GPS satellites, determining and generating geo-location or position data such as latitude-longitude values for a geophysical location of the computer system 600. Output device 612 may include hardware, software, firmware, and interfaces for generating position reporting packets, notifications, pulse or heartbeat signals, or other recurring data transmissions that specify a position of the computer system 600, alone or in combination with other application-specific data, directed toward host 624 or server 630.

Computer system 600 may implement the techniques described herein using customized hard-wired logic, at least one ASIC or FPGA, firmware or program instructions or logic which when loaded and used or executed in combination with the computer system causes or programs the computer system to operate as a special-purpose machine. According to some embodiments, the techniques herein are performed by computer system 600 in response to processor 604 executing at least one sequence of at least one instruction contained in main memory 606. Such instructions may be read into main memory 606 from another storage medium, such as storage 610. Execution of the sequences of instructions contained in main memory 606 causes processor 604 to perform the process steps described herein. In some embodiments, hard-wired circuitry may be used in place of or in combination with software instructions.

The term "storage media" as used herein refers to any non-transitory media that store data or instructions that cause a machine to operate in a specific fashion. Such storage media may comprise non-volatile media or volatile media. Non-volatile media includes, for example, optical or magnetic disks, such as storage 610. Volatile media includes dynamic memory, such as memory 606. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 602. Transmission media can also take the form of acoustic or light waves, such as those generated during radio-wave and infra-red data communications.

Various forms of media may be involved in carrying at least one sequence of at least one instruction to processor 604 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 600 can receive the data on the communication link and convert the data to be read by computer system 600. For instance, a receiver such as a radio frequency antenna or an infrared detector can receive the data carried in a wireless or optical signal and appropriate circuitry can provide the data to I/O subsystem 602 such as place the data on a bus. I/O subsystem 602 carries the data to memory 606, from which processor 604 retrieves and executes the instructions. The instructions received by memory 606 may optionally be stored on storage 610 either before or after execution by processor 604.

Computer system 600 also includes a communication interface 618 coupled to bus 602. Communication interface 618 provides a two-way data communication coupling to network link(s) 620 that are directly or indirectly connected to at least one communication network, such as a network 622 or a public or private cloud on the Internet. For example, communication interface 618 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 622 broadly represents a local area network (LAN), wide-area network (WAN), campus network, internetwork, or any combination thereof. Communication interface 618 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 618 sends and receives electrical, electromagnetic, or optical signals over signal paths that carry digital data streams representing various types of information.

Communication interface 618 can be based on an interconnect technology used for distributed computing systems, supercomputer systems, and high-performance computing systems. For example, communication interface 618 can be based on OMNI-PATH, INFINIBAND, ARIES, NVLINK, TOFU, or Ethernet.

Network link 620 typically provides electrical, electromagnetic, or optical data communication directly or through at least one network to other data devices, using, for example, satellite, cellular, Wi-Fi, or BLUETOOTH technology. For example, network link 620 may provide a connection through a network 622 to a host computer 624.

Furthermore, network link 620 may provide a connection through network 622 or to other computing devices via internetworking devices or computers that are operated by an Internet Service Provider (ISP) 626. ISP 626 provides data communication services through a world-wide packet data communication network represented as internet 628.

A server computer 630 may be coupled to internet 628. Server 630 broadly represents any computer, data center, virtual machine, or virtual computing instance with or without a hypervisor, or computer executing a containerized program system such as DOCKER or KUBERNETES. Server 630 may represent an electronic digital service that is implemented using more than one computer or instance and that is accessed and used by transmitting web services requests, uniform resource locator (URL) strings with parameters in HTTP payloads, API calls, app services calls, or other service calls. Computer system 600 and server 630 may form elements of a distributed computing system that includes other computers, a processing cluster, server farm or other organization of computers that cooperate to perform tasks or execute applications or services. Server 630 may comprise one or more sets of instructions that are organized as modules, methods, objects, functions, routines, or calls. The instructions may be organized as one or more computer programs, operating system services, or application programs including mobile apps. The instructions may comprise an operating system or system software; one or more libraries to support multimedia, programming or other functions; data protocol instructions or stacks to implement TCP/IP, HTTP or other communication protocols; file format processing instructions to interpret or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server 630 may comprise a web application server that hosts a presentation layer, application layer and data storage layer such as a relational database system using structured query language (SQL) or NoSQL, an object store, a graph database, a flat file system or other data storage.

) Computer system 600 can send messages and receive data and instructions, including program code, through the network(s), network link 620 and communication interface 618. In the Internet example, a server 630 might transmit a requested code for an application program through Internet 628, ISP 626, local network 622 and communication interface 618. The received code may be executed by processor 604 as it is received, or stored in storage 610, or other non-volatile storage for later execution.

The execution of instructions as described in this section may implement a process in the form of an instance of a computer program that is being executed and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 604. While each processor 604 or core of the processor executes a single task at a time, computer system 600 may be programmed to implement multitasking to allow each processor to switch between tasks that are being executed without having to wait for each task to finish. In some embodiments, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In some embodiments, for security and reliability, an operating system may prevent direct communication between independent processes, providing strictly mediated and controlled inter-process communication functionality.

8.0. General Considerations

Although some of various drawings may illustrate a number of logical stages in a particular order, stages that are not order dependent may be reordered and other stages may be combined or broken out. While some reordering or other groupings may be specifically mentioned, others will be obvious to those of ordinary skill in the art, so the ordering and groupings presented herein are not an exhaustive list of alternatives. Moreover, it should be recognized that the stages could be implemented in hardware, firmware, software, or any combination thereof.

The foregoing description, for the purpose of explanation, has been described regarding specific embodiments. However, the illustrative embodiments above are not intended to be exhaustive or to limit the scope of the claims to the precise forms disclosed. Many modifications and variations are possible in view of the above teachings. The embodiments were chosen to best explain the principles underlying the claims and their practical applications, to thereby enable others skilled in the art to best use the embodiments with various modifications as are suited to the uses contemplated.

In the foregoing specification, embodiments of the approach have been described with reference to numerous specific details that may vary from implementation to implementation. The specification and drawings are, accordingly, to be regarded in an illustrative rather than a restrictive sense. The sole and exclusive indicator of the scope of the approach, and what is intended by the applicants to be the scope of the approach, is the literal and equivalent scope of the set of claims that issue from this application, in the specific form in which such claims issue, including any subsequent correction.

Any definitions set forth herein for terms contained in the claims may govern the meaning of such terms as used in the claims. No limitation, element, property, feature, advantage, or attribute that is not expressly recited in a claim should limit the scope of the claim in any way. The specification and drawings are to be regarded in an illustrative rather than a restrictive sense.

As used herein the terms "include" and "comprise" (and variations of those terms, such as "including," "includes," "comprising," "comprises," "comprised" and the like) are intended to be inclusive and are not intended to exclude further features, components, integers, or steps.

References in this document to "an embodiment," indicate that the embodiment described or illustrated may include a particular feature, structure, or characteristic, but every embodiment may not necessarily include the particular feature, structure, or characteristic. Such phrases are not necessarily referring to the same embodiment. Further, when a particular feature, structure, or characteristic is described or illustrated in connection with an embodiment, it is believed to be within the knowledge of one skilled in the art to affect such feature, structure, or characteristic in connection with other embodiments whether or not explicitly indicated.

Various features of the disclosure have been described using process steps. The functionality/processing of a given process step could potentially be performed in different ways and by different systems or system modules. Furthermore, a given process step could be divided into multiple steps and/or multiple steps could be combined into a single step. Furthermore, the order of the steps can be changed without departing from the scope of the present disclosure.

It will be understood that the embodiments disclosed and defined in this specification extend to alternative combinations of the individual features and components mentioned or evident from the text or drawings. These different combinations constitute various alternative aspects of the embodiments.

What is claimed is:

1. A proxy server comprising: one or more computer processors; storage media; and instructions stored in the storage media that, when executed by the one or more computer processors, cause the one or more computer processors to perform: for each time period of a plurality of time periods: receiving, at the proxy server, a plurality of active communications connection counts of a plurality of active communications connections that were active within a time period; wherein an active communications connection, of the plurality of active communications connections, has a connection type; grouping connections of the plurality of active communications connections into N groups, wherein connections in a group, of the N groups, are defined by a same IP address of the proxy server, a same IP address of a destination, and a same port identifier of the destination; wherein each group of the N groups includes connections that are different than connections in other group of the N groups; wherein the N groups are ordered based on numerosity of connections in the N groups; determining a K count of active communications connections selected from the N groups of active communications connection counts, wherein K is an integer greater than 1 and not exceeding N; for each count of the K counts of active communications connections: determining a relative percentage of pre-connected communications connections, having a particular connection type and included in the count, to be pre-connected by the proxy server and available; wherein the relative percentage is a ratio between a count of the K counts and a K count of a largest group of the N groups; determining whether the relative percentage of the pre-connected communications connections of the particular connection type is already pre-connected by the proxy server and is available; in response to determining that the relative percentage of the pre-connected communications connections of the particular connection type is not already pre-connected or available within the time period, pre-connecting one or more particular communications connections of the particular connection type until the relative percentage of the pre-connected communications connections of the particular connection type is pre-connected and available.

2. The proxy server of claim 1, wherein the active communications connection, having the connection type, is defined by at least: an IP address of a plurality of IP addresses of the proxy server, an IP address of a plurality of IP addresses of a certain destination host of a plurality of destination hosts, and a port identifier of a port of a plurality of ports configured on the certain destination host.

3. The proxy server of claim 2, wherein a particular communications connection, of the one or more particular communications connections having the particular connection type, is defined by at least: a particular IP address of the proxy server, a particular IP address of a particular destination host of the plurality of destination hosts, and a particular port identifier of a particular port of a plurality of ports configured on the particular destination host.

4. The proxy server of claim 1, wherein the plurality of active communications connections that are active within the time period includes communications connection established by the proxy server for customers; wherein the one or more particular communications connections of the particular connection type are established by the proxy server pro-actively and in anticipation of requests from the customers.

5. The proxy server of claim 1, storing additional instructions for: receiving, at the proxy server, a request to establish a first communications connection, between the proxy server and a first destination host, having a first communications connection type; in response to receiving the request: determining whether the first communications connection having the first communications connection type has been pre-connected; in response to determining that the first communications connection having the first communications connection type has been pre-connected, using the first communications connection to facilitate communications between the proxy server and the first destination host.

6. The proxy server of claim 5, storing additional instructions for: in response to determining that the first communications connection having the first communications connection type has not been pre-connected, establishing the first communications connection having the first communications connection type.

7. The proxy server of claim 1, wherein, upon an expiration of the time period, the time period is updated to an updated time period; wherein a connection, of the plurality of active communications connections remains active within a particular time period, which may be extended by the proxy server if needed.

8. A computer-implemented method comprising: receiving, at a proxy server, a plurality of active communications connection counts of a plurality of active communications connections that were active within a time period; wherein an active communications connection, of the plurality of active communications connections, has a connection type; grouping connections of the plurality of active communications connections into N groups, wherein connections in a group, of the N groups, are defined by a same IP address of the proxy server, a same IP address of a destination, and a same port identifier of the destination; wherein each group of the N groups includes connections that are different than connections in other group of the N groups; wherein the N groups are ordered based on numerosity of connections in the N groups; determining a K count of active communications connections selected from the N groups of active communications connection counts, wherein K is an integer greater than 1 and not exceeding N; for each count of the K counts of active communications connections: determining a relative percentage of pre-connected communications connections, having a particular connection type and included in the count, to be pre-connected by the proxy server and available; wherein the relative percentage is a ratio between a count of the K counts and a K count of a largest group of the N groups; determining whether the relative percentage of the pre-connected communications connections of the particular connection type is already pre-connected by the proxy server and is available; in response to determining that the relative percentage of the pre-connected communications connections of the particular connection type is not already pre-connected or available within the time period, pre-connecting one or more particular communications connections of the particular connection type until the relative percentage of the pre-connected communications connections of the particular connection type is pre-connected and available.

9. The method of claim 8, wherein the active communications connection, having the connection type, is defined by at least: an IP address of a plurality of IP addresses of the proxy server, an IP address of a plurality of IP addresses of a certain destination host of a plurality of destination hosts, and a port identifier of a port of a plurality of ports configured on the certain destination host.

10. The method of claim 9, wherein a particular communications connection, of the one or more particular communications connections having the particular connection type, is defined by at least: a particular IP address of the proxy server, a particular IP address of a particular destination host of the plurality of destination hosts, and a particular port identifier of a particular port of a plurality of ports configured on the particular destination host.

11. The method of claim 8, wherein the plurality of active communications connections that are active within the time period includes communications connection established by the proxy server for customers; wherein the one or more particular communications connections of the particular connection type are established by the proxy server pro-actively and in anticipation of requests from the customers.

12. The method of claim 8, further comprising: receiving, at the proxy server, a request to establish a first communications connection, between the proxy server and a first destination host, having a first communications connection type; in response to receiving the request: determining whether the first communications connection having the first communications connection type has been pre-connected; in response to determining that the first communications connection having the first communications connection type has been pre-connected, using the first communications connection to facilitate communications between the proxy server and the first destination host.

13. The method of claim 12, further comprising: in response to determining that the first communications connection having the first communications connection type has not been pre-connected, establishing the first communications connection having the first communications connection type.

14. The method of claim 8, wherein, upon an expiration of the time period, the time period is updated to an updated time period; wherein a connection, of the plurality of active communications connections remains active within a particular time period, which may be extended by the proxy server if needed.

15. A non-transitory computer-readable storage media storing one or more instructions which, when executed by one or more computer processors included in a proxy server device also comprising a storage media, cause the one or more computer processors to perform: receiving, at a proxy server, a plurality of active communications connection counts of a plurality of active communications connections that were active within a time period; wherein an active communications connection, of the plurality of active communications connections, has a connection type; grouping connections of the plurality of active communications connections into N groups, wherein connections in a group, of the N groups, are defined by a same IP address of the proxy server, a same IP address of a destination, and a same port identifier of the destination; wherein each group of the N groups includes connections that are different than connections in other group of the N groups; wherein the N groups are ordered based on numerosity of connections in the N groups; determining a K count of active communications connections selected from the N groups of active communications connection counts, wherein K is an integer greater than 1 and not exceeding N; for each count of the K counts of active communications connections: determining a relative percentage of pre-connected communications connections, having a particular connection type and included in the count, to be pre-connected by the proxy server and available; wherein the relative percentage is a ratio between a count of the K counts and a K count of a largest group of the N groups; determining whether the relative percentage of the pre-connected communications connections of the particular connection type is already pre-connected by the proxy server and is available; in response to determining that the relative percentage of the pre-connected communications connections of the particular connection type is not already pre-connected or available within the time period, pre-connecting one or more particular communications connections of the particular connection type until the relative percentage of the pre-connected communications connections of the particular connection type is pre-connected and available.

16. The non-transitory computer-readable storage media of claim 15, wherein the active communications connection, having the connection type, is defined by at least: an IP address of a plurality of IP addresses of the proxy server, an IP address of a plurality of IP addresses of a certain destination host of a plurality of destination hosts, and a port identifier of a port of a plurality of ports configured on the certain destination host.

17. The non-transitory computer-readable storage media of claim 16, wherein a particular communications connection, of the one or more particular communications connections having the particular connection type, is defined by at least: a particular IP address of the proxy server, a particular IP address of a particular destination host of the plurality of destination hosts, and a particular port identifier of a particular port of a plurality of ports configured on the particular destination host.

18. The non-transitory computer-readable storage media of claim 15, wherein the plurality of active communications connections that are active within the time period includes communications connection established by the proxy server for customers; wherein the one or more particular communications connections of the particular connection type are established by the proxy server pro-actively and in anticipation of requests from the customers.

19. The non-transitory computer-readable storage media of claim 15, storing additional instructions for: receiving, at the proxy server, a request to establish a first communications connection, between the proxy server and a first destination host, having a first communications connection type; in response to receiving the request: determining whether the first communications connection having the first communications connection type has been pre-connected; in response to determining that the first communications connection having the first communications connection type has been pre-connected, using the first communications connection to facilitate communications between the proxy server and the first destination host.

20. The non-transitory computer-readable storage media of claim 19, storing additional instructions for: in response to determining that the first communications connection having the first communications connection type has not been pre-connected, establishing the first communications connection having the first communications connection type; wherein, upon an expiration of the time period, the time period is updated to an updated time period; wherein a connection, of the plurality of active communications connections remains active within a particular time period, which may be extended by the proxy server if needed.

* * * * *